United States Patent Office 3,449,473
Patented June 10, 1969

3,449,473
HYDROCARBYL AND HYDROCARBYLENE MONO- AND BIS(PHOSPHORODIFLUORIDO)DITHIOATE ESTERS
Herbert W. Roesky, Gottingen, Germany, assignor to E. I. du Pont de Nemours and Company, Wilmington, Del., a corporation of Delaware
No Drawing. Filed Aug. 3, 1966, Ser. No. 569,839
Int. Cl. C07f 9/20; C08f 45/50; C08g 51/50
U.S. Cl. 260—928                                            5 Claims

---

ABSTRACT OF THE DISCLOSURE

Compounds of the formulae $$RS\overset{S}{\underset{\|}{P}}F_2 \text{ and } R'[S\overset{S}{\underset{\|}{P}}F_2]_2$$

where R is monovalent hydrocarbyl and R' divalent hydrocarbylene of 1–8 carbons, useful as plasticizers and heat transfer liquids, and their preparation from the salts of phosphorodifluoridodithionic acid and RX or R'X$_2$ compounds, where R and R' are as above and X is an alkylating ester group, or, in the case of the second formula, from dithiobis(phosphonodithioic)difluoride and an $$\underset{RC=CR}{\overset{H\ H}{}}$$

compound, R being as above.

---

Description of the invention

The compounds of this invention are hydrocarbyl and hydrocarbylene mono- and bis(phosphorodifluorido)dithioate esters. These esters have one of the formulas:

$$RS\overset{S}{\underset{\|}{P}}F_2$$

and $$R'[S\overset{S}{\underset{\|}{P}}F_2]_2$$

in which R is a monovalent hydrocarbyl radical of from 1–8 carbons and R' is a divalent hydrocarbylene radical of from 1–8 carbons.

In connection with the nomenclature of the products of the invention, reference should be had to the discussion of the nomenclature of phosphorus acid derivatives in Chem. Eng. News 30, 4515–4522 (1952) and "Textbook for Chemical Society Authors," 1960, London, The Chemical Society at Chapter 6, pp. 154–163.

The compounds of the invention are prepared in accord with the following stoichiometry:

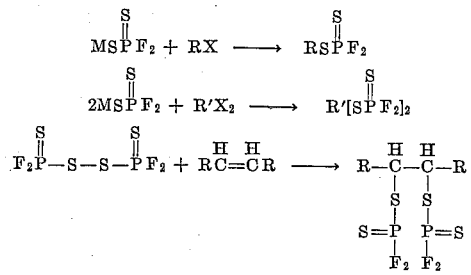

wherein M is an alkali metal, alkaline earth metal, ammonium or substituted ammonium cation; X is an active alkylating ester group; and R and R' are as defined above, and in the case of the ethylene reactants $$\underset{RC=CR}{\overset{H\ H}{}}$$

the two R's may be together joined to form with the C=C linkage a cyclic structure, i.e., a cyclohydrocarbene.

Specific embodiments of M include: the alkali metals Li, Na, K, Rb, Cs, and Fr, i.e., the alkali metals of Group I–A of the Periodic Table, of atomic numbers 3–87 or the alkaline earth metals Be, Mg, Ca, Sr, Ba, and Ra, i.e., the alkaline earth metals or Group II–A of the Periodic Table of atomic numbers from 4–88; ammonium and substituted ammonium cations, i.e., NH$_4^+$ and R$_4$N$^+$; X includes the halides and the strong inorganic acid anions and, more particularly, the halide anions of Group VII–A of the Periodic Table from atomic numbers 9–53, i.e., F, Cl, Br, and I, and sulfate, phosphate, nitrate, and the like; R is expressly inclusive of alkyl, aryl, and cycloalkyl hydrocarbyl radicals and R' is expressly inclusive of the alkylene, arylene, and cycloalkylene hydrocarbylene radicals.

Because of greater reactivity, the preferred species of M are the alkali metals of atomic numbers from 3–55 and the preferred species of X are the halides of atomic numbers 17–53 and especially Cl and Br.

The starting materials, $$MS\overset{S}{\underset{\|}{P}}F_2$$

i.e., the salts of phosphorodifluoridodithioic acid, are disclosed and expressly claimed in my copending application Ser. No. 569,810, filed concurrently herewith, now abandoned but refiled as Ser. No. 715,466 on Mar 5, 1968; and dithiobis(phosphonodithioic)difluoride $$(F_2\overset{S}{\underset{\|}{P}}-S-S-\overset{S}{\underset{\|}{P}}F_2)$$

is disclosed and claimed in my copending application Ser. No. 569,847, also filed concurrently herewith, now U.S. Patent 3,397,967. In accord with the foregoing stoichiometries, the reactants are charged in the indicated molecular proportions. To facilitate formation of the desired ester products to the maximum degree, excesses of the alkylating hydrocarbyl and hydrocarbylene esters as well as the dihydrocarbyl-substituted ethylenes should be employed. The reaction is normally not spontaneous and will preferably be driven to completion thermally. As is true of all such reactions, reaction time and reaction temperatures are interdependent variables. Normally reaction temperatures will range from room temperature to 100–150° C. for reaction times ranging from 1–2 hours to 12–24 hours. Conventionally the reactants in accord with the foregoing stoichiometries will simply be mixed and heated with stirring for the indicated time-temperature interval.

Although not essential, it is generally more convenient to have present a liquid reaction medium. This medium, which can vary widely, serves primarily as an aid to mixing and as a heat transfer agent. The reaction medium should, of course, be unreactive with the phosphorodifluoridodithioate salts and the hydrocarbyl and hydrocarbylene bis(phosphorodifluorido)dithioate ester products and, where used, the dithiobis(phosphonodithioic)difluoride starting material. A simple description of such useful reaction media include those basically free of active hydrogen. Suitable specific types include the hydrocarbyl ethers such as diethyl ether, dibutyl ether, and the like; the hydrocarbyl ketones such as methyl ethyl ketone, diethyl ketone, and the like; the hydrocarbyl nitriles such as acetonitrile, propionitrile, and the like; the cyclic hydrocarbyl sulfones such as tetramethylene cyclic sulfone; and the like.

In the following examples parts are by weight unless otherwise indicated.

EXAMPLE I

Part A

To a slurry of 3 parts of cesium fluoride in about 7.86 parts of acetonitrile was added trisfluoridothiophosphoric acid (SPF$_3$) until no further absorption occurred. During the absorption the cesium fluoride went into solution and solid CsPF$_6$ precipitated out. The reaction mixture was allowed to stand overnight at room temperature, and the solid product was removed by filtration and checked by infrared absorption spectra as CsPF$_6$. The acetonitrile solvent was removed from the liquid filtrate, whereby there was obtained the solid cesium salt of phosphorodifluoridodithioic acid exhibiting a characteristic infrared spectrum for this structure. The product was identified by a characteristic n-m-r spectrum for the structure.

*Analysis.*—Calcd. for CsS$_2$PF$_2$: Cs, 49.9%; F, 14.3%; S, 24.2%; P, 11.6%. Found: Cs, 48.1%; F, 13.4%; S, 21.6%; P, 11.9%.

Part B

A mixture of 26.6 parts of the above cesium phosphorodifluoridodithioate and 11 parts of ethyl bromide in 60 parts of tetramethylene cyclic sulfone was heated with stirring for three hours at 70–80° C. Unreacted ethyl bromide and the product ethyl phosphorodifluoridodithioate were removed by vacuum distillation and the mixture then shaken with excess ice water for a period of five minutes. The organic layer was separated and dried over anhydrous sodium sulfate. There was then obtained by distillation 9 parts (55% of theory) of ethyl phosphorodifluoridodithioate as a clear, colorless liquid boiling at 124–125° C. at atmospheric pressure. On redistillation, the ethyl phosphorodifluoridodithioate boiled at 124° C. at atmospheric pressure. The product was identified by a characteristic n-m-r spectrum for the structure.

*Analysis.*—Calcd. for C$_2$H$_5$F$_2$S$_2$P: C, 14.8%; H, 3.1%; F, 23.4%; S, 39.5%; P, 19.1%; M.W., 162. Found: C, 15.3%; H, 3.5%; F, 23.0%; S, 39.1%; P, 18.5%; M.W. (cryoscopic in benzene), 157.

EXAMPLE II

A mixture of 27 parts of the above cesium phosphorodifluoridodithioate and 14 parts of isopropyl bromide in 60 parts of tetramethylene cyclic sulfone was heated at the reflux under nitrogen at 80–100° C. for five hours. The reaction mixture was then cooled to room temperature and the volatile products removed by distillation under reduced pressure. The resulting liquid product was shaken with excess ice water for one minute and the oily organic layer separated and dried over anhydrous sodium sulfate overnight. On distillation there was obtained five parts (28% of theory) of isopropylphosphorodifluoroidodithioate as a clear, colorless liquid boiling at 137° C. at atmospheric pressure. The product was identified by a characteristic n-m-r spectrum for the structure.

*Analysis.*—Calcd. for C$_3$H$_7$F$_2$S$_2$P: C, 20.4%; H, 4.0%; F, 21.6%; S, 36.4%; P, 17.6%; M.W., 176. Found: C, 21.4%; H, 4.2%; F, 20.2%; S, 36.1%; P, 17.7%; M.W., 171.

EXAMPLE III

Forty parts of the above cesium phosphorodifluorododithioate was slurried in about 75 parts of methyl ethyl ketone, and 25.7 parts of benzyl bromide was added. The reaction mixture was refluxed at 90–100° C. for four hours, then cooled to room temperature, filtered, and the methyl ethyl ketone removed from the filtrate by distillation under reduced pressure. The residue was washed twice with excess ice water, separated, and dried over anhydrous sodium sulfate. After three distillations under reduced pressure, there was finally obtained 15 parts (45% of theory) of pure benzylphosphorodifluoridodithioate as a yellow, viscous liquid boiling at 106–109° C./8 mm. of mercury (99° C./mm. of mercury). The product was identified by a characteristic n-m-r spectrum for the structure.

*Analysis.*—Calcd. for C$_7$H$_7$F$_2$S$_2$P: C, 37.5%; H, 3.1%; F, 17.0%; S, 28.6%; P, 13.3%; M.W., 224. Found: C, 38.5%; H, 3.4%; F, 16.0%; S, 28.2%; P, 13.8%; M.W., 221.

EXAMPLE IV

Part A

To a slurry of 11 parts of the above cesium phosphorodifluoridodithioate in about 35 parts of dry diethyl ether was added dropwise 3.3 parts of bromine with stirring. The bromine color disappeared at once, and the resultant reaction mixture was filtered. The diethyl ether solvent was removed by distillation under reduced pressure and from the resultant residue there was obtained by distillation four parts (72.7% of theory) of dithiobis-(phosphonothioic difluoride).

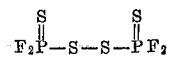

as a clear, colorless liquid boiling at 58–60° C./10 mm. of mercury (76° C./24 mm. of mercury). The product was identified by a characteristic n-m-r spectrum for the structure.

*Analysis.*—Calcd. for S$_4$P$_2$F$_4$: S, 48.1%; F, 28.6%; P, 23.3%; M.W., 266. Found: S, 48.0%; F, 28.3%; P, 23.5%; M.W., 260.

Part B

To 6 parts of the above S$_4$P$_2$F$_4$ was added 0.5 part of iodine and slowly with stirring 1.9 parts of cyclohexene. The reaction mixture was stirred for 12 hours at room temperature, and on distillation there was obtained 1.0 part (12.6% of theory) of cyclohexylene bis(phosphorodifluoridodithioate) as a slightly red liquid boiling at 98° C./0.1 mm. of mercury (104° C./0.5 mm. of mercury). The product was identified by a characteristic n-m-r spectrum for the structure.

*Analysis.*—Calcd. for C$_6$H$_{10}$F$_4$S$_4$P$_2$: C, 20.1%; H, 2.9%; F, 21.8%; S, 36.8%; P, 17.8%. Found: C, 21.0%; H, 3.0%; F, 20.5%; S, 34.3%; P, 17.5%.

The products of this invention are useful in precipitating large cations such as Cr$^{II}$, Mn$^{II}$, Pd$^{II}$, Pt$^{II}$, Hg$^{I}$, Hg$^{II}$, Th$^{IV}$, U$^{IV}$, and the like from solutions which are miscible enough with the organic-soluble hydrocarbyl and hydrocarbylene bis(phosphorodifluorido)dithioate esters. Ideally, for precipitant action, the reaction system from which the precipitate is to be obtained should be of mixed aqueous/organic nature. The partition coefficient of the solubilities of the two entities involved, i.e., the large metal cation and the phosphorodifluoridodithioate ester, should be such that they are present in, respectively, the aqueous and organic phase in such concentrations that in the crossover aqueous/organic miscibility area sufficient concentrations of both will be present to effect precipitation.

The anion portions of these phosphorodifluoridodithioate esters are strong reducing agents and, as such, in any aqueous or preferably aqueous/organic reaction systems under conditions of controlled pH (normally preferably on the basic side) sufficient of the esters will be saponified so that some of the corresponding anions will be generated and will be found in the aqueous phase to afford reduction of the desired species, e.g., potassium permanganate. Accordingly, in these mixed aqueous/organic systems, the esters of the present invention are useful as analytical reagents in the determination of the relative oxidizing strength of various chemical oxidizing agents.

The hydrocarbyl and hydrocarbylene mono- and bis-(phosphorodifluorido)dithioate esters of the present invention are liquids, except in the upper ranges of carbon content of the ester moieties, they are relatively low melting solids. They are thermally stable and chemically largely non-reactive. Accordingly, they are useful as plasticizing agents for organic polymers, and, in particular, for those containing a plurality of fluorine substituents such as polyvinyl fluoride, polytetrafluoroethylene, and the like. The compounds of the invention, by virtue of their thermal stability and relatively low chemical reactivity are also useful as heat transfer media and as the working fluid in hydraulic systems requiring severe demand exposure.

The embodiments of the invention in which an exclusive property or privilege is claimed are defined as follows:

1. A compound of the class consisting of

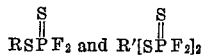

wherein R is selected from the group consisting of alkyl, cycloalkyl and aryl hydrocarbon, all of up to 8 carbons, and R' is selected from the group consisting of alkylene, cycloalkylene and arylene hydrocarbon, all of up to 8 carbons.

2. Ethyl phosphorodifluoridodithioate.
3. Isopropylphosphorodifluoroidodithioate.
4. Benzylphosphorodifluoridodithioate.
5. Cyclohexylene bis(phosphorodifluoridodithioate).

References Cited
UNITED STATES PATENTS

| | | | |
|---|---|---|---|
| 2,836,534 | 5/1958 | Birum | 260—960 X |
| 2,897,227 | 7/1959 | Slagh | 260—960 X |
| 3,013,047 | 12/1961 | Schrader et al. | 260—979 X |
| 3,025,316 | 3/1962 | Lorenz et al. | 260—979 X |
| 3,097,997 | 7/1963 | Szabo et al. | 260—979 X |

CHARLES B. PARKER, *Primary Examiner.*

R. L. RAYMOND, *Assistant Examiner.*

U.S. Cl. X.R.

260—429, 429.1, 431, 438.5, 501.15, 501.21, 502.4, 543, 900, 960, 971, 979